(12) United States Patent
Gierow et al.

(10) Patent No.: US 12,539,692 B2
(45) Date of Patent: Feb. 3, 2026

(54) FLAT-SHAPED COMPOSITE MATERIAL, PACKAGE SLEEVE AND PACKAGE WITH TRAPEZOIDAL GABLE

(71) Applicant: SIG Services AG, Neuhausen am Rheinfall (CH)

(72) Inventors: Norman Gierow, Duesseldorf (DE); Philippe Hauser, Schaffhausen (CH); Ali Kaylan, Duesseldorf (DE); Thomas Keck, Aachen (DE); Heike Klein, Duesseldorf (DE); Stefan Mergel, Duesseldorf (DE); Georg Schulte, Toenisvorst (DE); Christoph Wirtz, Linnich (DE)

(73) Assignee: SIG Services AG, Neuhausen am Rheinfall (CH)

( * ) Notice: Subject to any disclaimer, the term of this patent is extended or adjusted under 35 U.S.C. 154(b) by 658 days.

(21) Appl. No.: 17/780,808

(22) PCT Filed: Oct. 21, 2020

(86) PCT No.: PCT/EP2020/079561
§ 371 (c)(1),
(2) Date: May 27, 2022

(87) PCT Pub. No.: WO2021/104754
PCT Pub. Date: Jun. 3, 2021

(65) Prior Publication Data
US 2022/0410548 A1    Dec. 29, 2022

(30) Foreign Application Priority Data
Nov. 29, 2019    (DE) .................... 10 2019 132 426.2

(51) Int. Cl.
*B32B 27/12*    (2006.01)
*B32B 27/10*    (2006.01)

(52) U.S. Cl.
CPC .............. *B32B 27/12* (2013.01); *B32B 27/10* (2013.01); *B32B 2307/7265* (2013.01)

(58) Field of Classification Search
None
See application file for complete search history.

(56) References Cited

U.S. PATENT DOCUMENTS

| D540,164 S | 4/2007 | Franic |
|---|---|---|
| 9,227,750 B2 | 1/2016 | Franic |
| (Continued) | | |

FOREIGN PATENT DOCUMENTS

| CN | 103228542 A | 7/2013 |
|---|---|---|
| CN | 107264910 A | 10/2017 |
| (Continued) | | |

OTHER PUBLICATIONS

Iwao Totsuka, "The Latest Situation of Paper Containers and PET Blow Bottles", Brewing Society of Japan, Brewing Society (1990), vol. 85, Issue 11, p. 791-799—Relevant for reasons illustrated in drawings.

*Primary Examiner* — Yan Lan
(74) *Attorney, Agent, or Firm* — The Webb Law Firm

(57) ABSTRACT

A flat-shaped composite material is represented and described for manufacturing a package, including: a polymer outer layer, a polymer inner layer, a fibrous support layer, which is arranged between the polymer outer layer and the polymer inner layer. The flat-shaped composite material has a plurality of fold lines, which are arranged and designed such that a closed package can be manufactured by folding the flat-shaped composite material along the fold lines and by connecting seam surfaces of the flat-shaped composite material and a sleeve surface. The sleeve surface includes a front surface, a first side surface, a second side surface, a first rear surface and a second rear surface, and base surfaces. The base surfaces include triangular base surfaces and (Continued)

quadrangular base surfaces and gable surfaces. The gable surfaces include triangular gable surfaces and quadrangular gable surfaces. The base surfaces and the gable surfaces are arranged on opposite sides of the sleeve surface. In order to enable the manufacture of packages with even more complex geometries even in the gable and base region, at least one quadrangular gable surface is provided with two small gable surface angles, which are smaller than 90°, with two large gable surface angles, which are greater than 90°, and with an angle sum, which is greater than 360°. A package sleeve made of a composite material and a package manufactured from the composite material or from the package sleeve are also represented and described.

13 Claims, 14 Drawing Sheets

(56) References Cited

U.S. PATENT DOCUMENTS

| | | | |
|---|---|---|---|
| 9,487,319 B2 | 11/2016 | Okezawa | |
| D803,044 S | 11/2017 | Franic | |
| 11,014,703 B2 | 5/2021 | Nakamura et al. | |
| 11,299,314 B2 | 4/2022 | Dammers et al. | |
| 11,465,799 B2 | 10/2022 | Dammers et al. | |
| 11,745,903 B2 | 9/2023 | Breitmar | |
| 2008/0296359 A1 | 12/2008 | Kortsmit et al. | |
| 2011/0113733 A1* | 5/2011 | Franic | B65D 5/4266 53/167 |
| 2016/0376045 A1 | 12/2016 | Seiche | |
| 2019/0337664 A1 | 11/2019 | Dammers et al. | |
| 2020/0207055 A1 | 7/2020 | Wirtz et al. | |

FOREIGN PATENT DOCUMENTS

| | | | |
|---|---|---|---|
| CN | 107264911 A | 10/2017 | |
| CN | 108883845 A | 11/2018 | |
| DE | 102016003824 A1 | 10/2017 | |
| DE | 102017215078 A1 | 2/2019 | |
| EM | 000474259-0005 | 8/2008 | |
| EM | 000474259-0006 | 8/2008 | |
| EM | 000474259-0008 | 8/2008 | |
| EM | 000474259-0011 | 8/2008 | |
| EM | 004370823-0001 | 1/2020 | |
| EP | 2133279 B1 * | 6/2017 | ............ B32B 15/08 |
| JP | 2012136289 A | 7/2012 | |
| JP | 5606428 B2 | 10/2014 | |
| JP | 1536152 S | 10/2015 | |
| JP | 201756997 A | 3/2017 | |
| JP | 1597429 S | 2/2018 | |
| JP | 2019510698 A | 4/2019 | |
| JP | 6618085 B2 | 12/2019 | |
| JP | 1690774 S | 7/2021 | |
| JP | 1730497 S | 11/2022 | |
| JP | 1732776 S | 12/2022 | |
| JP | 1732785 S | 12/2022 | |
| WO | 2004076302 A1 | 9/2004 | |
| WO | DM083691 | 5/2014 | |
| WO | 2015003852 A1 | 1/2015 | |

* cited by examiner

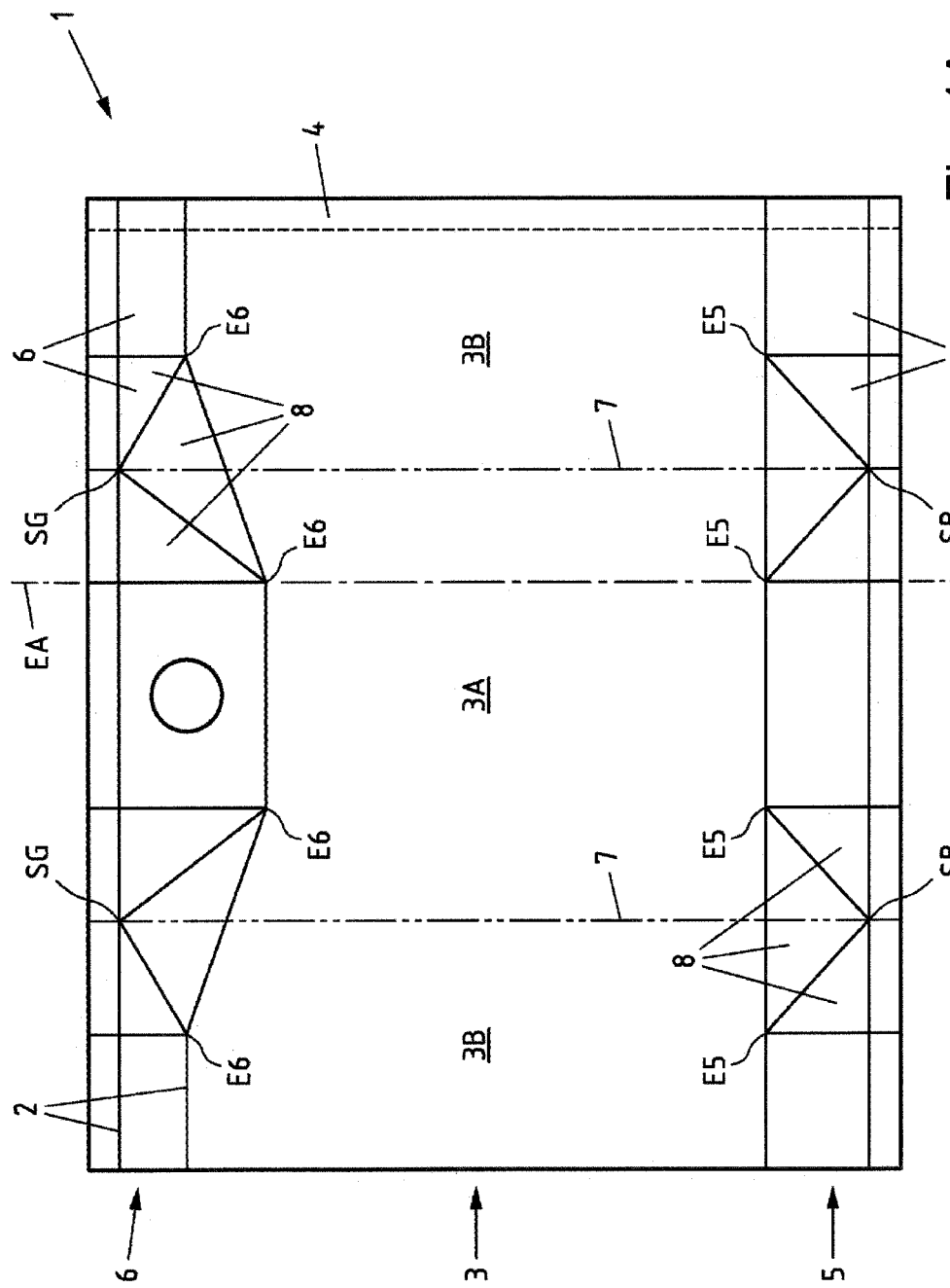

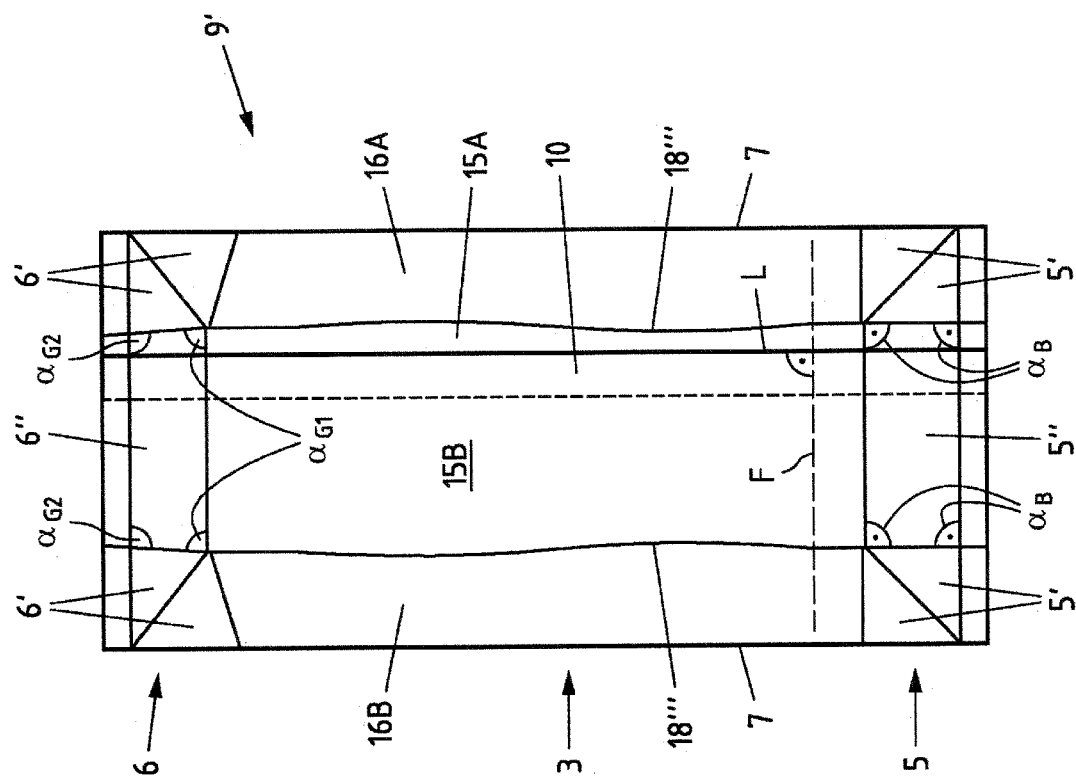

FLAT-SHAPED COMPOSITE MATERIAL, PACKAGE SLEEVE AND PACKAGE WITH TRAPEZOIDAL GABLE

CROSS-REFERENCE TO RELATED APPLICATIONS

This application is the United States national phase of International Application No. PCT/EP2020/079561 filed Oct. 21, 2020, and claims priority to German Patent Application No. 10 2019 132 426.2 filed Nov. 29, 2019, the disclosures of which are hereby incorporated by reference in their entirety.

BACKGROUND OF THE INVENTION

Field of the Invention

The invention relates to a flat-shaped composite material for manufacturing a package, comprising: a polymer outer layer, a polymer inner layer, a fibrous support layer, which is arranged between the polymer outer layer and the polymer inner layer, wherein the flat-shaped composite material has a plurality of fold lines, which are arranged and designed such that a closed package can be manufactured by folding the flat-shaped composite material along the fold lines and connecting seam surfaces of the flat-shaped composite material, a sleeve surface, wherein the sleeve surface comprises a front surface, a first side surface, a second side surface, a first rear surface and a second rear surface, base surfaces, wherein the base surfaces comprise triangular base surfaces and quadrangular base surfaces, and gable surfaces, wherein the gable surfaces comprise triangular gable surfaces and quadrangular gable surfaces, wherein the base surfaces and the gable surfaces are arranged on opposite sides of the sleeve surface.

Description of Related Art

The invention further relates to a package sleeve made of a composite material for manufacturing a package, comprising: a sleeve surface, wherein the sleeve surface comprises a front surface, a first side surface, a second side surface, a first rear surface and a second rear surface, base surfaces, wherein the base surfaces comprise triangular base surfaces and quadrangular base surfaces, gable surfaces, wherein the gable surfaces comprise triangular gable surfaces and quadrangular gable surfaces, two secondary fold lines, which run parallel to one another through the sleeve surface, and a longitudinal seam, which connects two edge regions of the composite material to form a circumferential package sleeve, which is open both in the region of the base surfaces and in the region of the gable surfaces, wherein the base surfaces and the gable surfaces are arranged on opposite sides of the sleeve surface, and wherein the package sleeve is folded along both secondary fold lines.

The invention lastly relates to a package made of a composite material, wherein the package is manufactured from a flat-shaped composite material as described herein, or wherein the package is manufactured from a package sleeve as described herein, and wherein the package is sealed in the region of the base surfaces and in the region of the gable surfaces. In particular, it can be provided that the package is manufactured from a flat-shaped composite material as described herein or that the package is manufactured from a package sleeve as described herein, and wherein the package is sealed in the region of the base surfaces and in the region of the gable surfaces.

Packaging (in filled condition: "packages") can be manufactured in different ways and from an extremely wide range of materials. A widely used possibility for their manufacture consists of manufacturing a blank from a flat-shaped composite material by cutting from which, through folding and further steps, first a package sleeve and finally a package is created. Alternatively, it is also possible to manufacture a package directly from the composite material, i.e. without the intermediate step of the package sleeve. This type of manufacture has the advantage, among others, that the composite material and package sleeves are very flat and can thus be stacked, saving space. In this way, the composite material and the package sleeves can be manufactured in a different location than the folding and filling of the package. Composite materials are frequently used as material; for example, a flat-shaped composite consisting of a plurality of thin layers of paper, cardboard, plastic and/or metal, in particular aluminium. Such packages are widely used in the foodstuffs industry in particular.

A first manufacturing step frequently consists of manufacturing a blank from a flat-shaped composite material by cutting and from the blank producing a circumferential package sleeve through folding and welding or adhering a seam. The folding usually takes place along stamped fold lines. The location of the fold lines thereby often corresponds to the location of the edges of the package which is to be manufactured from the package sleeve. This has the advantage that the flat-shaped composite material or the blank produced therefrom and the package sleeve are exclusively folded at points at which the finished package is folded in any case. A method for manufacturing a package from a package sleeve is known, for example, from WO 2015/003852 A9 (in particular FIG. 1A to FIG. 1E). The package described therein has a rectangular cross-sectional profile and is generally cuboid.

However, one disadvantage of folding the package sleeves along the later package edges is that only packages with angular cross-sectional surfaces can be manufactured. Moreover, only packages whose cross-sectional surface is identical in the vertical direction of the package can be manufactured. In contrast, alternative designs, for example rounded edges or free forms instead of the edges, are not possible.

In order to enable a more variable shaping, package sleeves have already been proposed whose folding edges do not correspond to the package edges of the package manufactured from the package sleeve. This is achieved in that the package sleeve is folded along so-called "secondary fold lines", which are folded back again during the manufacture of the package and thus do not form any edges of the package. This makes it possible to manufacture packages whose sleeve surface has no edges or in any case no straight edges. Such package sleeves and packages manufactured therefrom are known, for example, from DE 10 2016 003 824 A1 (in particular FIG. 2A to FIG. 3G').

Although the use of "secondary fold lines" enables a slightly greater flexibility in the design of the shape of the sleeve surface of a package, the secondary fold lines have no influence on the design of the base and the gable of the package.

SUMMARY OF THE INVENTION

Against this background, the object underlying the invention is to design and further develop the flat-shaped composite material described at the outset and explained in more detail above in such manner that the manufacture of packages, in particular liquid-tight packages, with even more complex geometries even in the gable and base region, is made possible.

This object is achieved in the case of the flat-shaped composite material as described herein by at least one quadrangular gable surface with two small gable surface angles, which are smaller than 90°, with two large gable surface angles, which are greater than 90°, and with an angle sum, which is greater than 360°.

The flat-shaped composite material according to the invention is used to manufacture a package. The flat-shaped composite material can be cut to a defined size, wherein the size can be sufficient to manufacture a plurality of packages or is only sufficient to manufacture a single package. A composite material cut to a defined size, in particular to the size of an individual package, is therefore also referred to as a "blank". The flat-shaped composite material has a plurality of overlapping and interconnected layers and thus forms a flat-shaped composite. The flat-shaped composite material comprises a polymer outer layer, a polymer inner layer and a fibrous support layer, which is arranged between the polymer outer layer and the polymer inner layer. The polymer inner layer and polymer outer layer give the composite material liquid-tight properties as they are manufactured from plastic. The fibrous support layer (preferably: paper or cardboard), on the other hand, primarily serves to give the composite material improved mechanical properties, in particular improved rigidity. Optionally, a barrier layer can also be provided, which is also arranged between the polymer outer layer and the polymer inner layer (preferably between the fibrous support layer and the polymer inner layer). The barrier layer can, for example, be manufactured from aluminium and is intended to prevent light and/or oxygen from passing through. The flat-shaped composite material has a sleeve surface which comprises a front surface, a first side surface, a second side surface, a first rear surface and a second rear surface. The flat-shaped composite material also has base surfaces which comprise triangular base surfaces and quadrangular base surfaces. The flat-shaped composite material also has gable surfaces which comprise triangular gable surfaces and quadrangular gable surfaces. Preferably, the base surfaces and the gable surfaces each have two or three quadrangular surfaces and six triangular surfaces. The quadrangular surfaces serve the purpose of folding the base and the gable of the package. The triangular surfaces serve to fold the excess composite material into projecting "ears" which are then laid against the package. The base surfaces and the gable surfaces are arranged on opposite sides of the sleeve surface. Preferably, the gable surfaces are, in a standing package, arranged above the sleeve surface and the base surfaces are arranged beneath the sleeve surface. The flat-shaped composite material also has a plurality of fold lines, which are arranged and designed such that a closed package can be manufactured by folding the flat-shaped composite material along the fold lines and by connecting seam surfaces of the flat-shaped composite material. The fold lines (in particular before folding also called: "crease lines") should therefore facilitate the folding of the flat-shaped composite material; they can be produced by material weakenings. Since the packages to be manufactured from the composite material are to be liquid-tight, material weakenings do not use perforations, but rather (usually linear) material displacements, which are embossed into the composite material with pressing tools.

According to the invention, at least one quadrangular gable surface is provided with two small gable surface angles, which are smaller than 90°, with two large gable surface angles, which are greater than 90°, and with an angle sum, which is greater than 360°. Angles that are not equal to 90° result in a gable surface whose shape deviates from a rectangular or square shape. A quadrangular gable surface with two small (<90°) and two large (>90°) gable surface angles can, for example, be achieved by means of a trapezoid, a parallelogram or by a rhombus. An angle sum deviating from 360° can, for example, be achieved by one or a plurality of sides of the quadrangular gable surface not running straight, but curved (as for example in the case of an arched quadrilateral or arched polygon). An angle sum greater than 360° can be achieved by at least one side of the quadrangular gable surface being curved outwards. The base surface angles, on the other hand, are preferably 90°, so that a rectangular, in particular square base shape results. The design of the gable surface according to the invention has a plurality of advantages. In addition to a more visually appealing shape, the technical effect is achieved such that the packages to be manufactured from the flat-shaped composite material can be gripped more easily with one hand, since an edge of the gable surface (preferably the front edge) is shorter than the other edges (in particular the rear edge), so that the package is narrower on the front side. The design according to the invention also leads to the technical effect that the contact surface between packages arranged next to one another (e.g. during transport or on the sales shelf) is smaller than in the case of cuboid packages, whose side surfaces almost completely touch. In other words, there is a gap or free space between packages arranged next to each other through which air can circulate. This has the advantage of reducing the risk of mould forming as a result of moisture. By the angle sum being greater than 360°, it is also achieved that there is more space for a dispensing element. Preferably, the quadrangular gable surface has an angle sum of at least 370°, in particular of at least 380°, preferably of at least 390°. Angle sums in the range between 390° and 410° have proven to be advantageous.

According to a further development of the flat-shaped composite material, it is provided that at least one of the quadrangular gable surfaces is approximately trapezoidal. By designing the gable surface of the composite material to be approximately trapezoidal, the gable of the package manufactured therefrom also becomes trapezoidal. The trapezoidal shape has the advantage that one of the two parallel sides or edges (preferably the front edge of the gable) is shorter than the opposite side or edge (preferably the rear edge of the gable), in contrast to a rhombus in which the opposite sides are the same length. This makes it easy to grip larger-volume packages from the front with one hand. A trapezoid is generally understood as a quadrilateral in which two sides are parallel to each other. Here, trapezoid quadrilaterals should also be understood as quadrilaterals with curved sides, provided that when the four corners are connected by (fictitious) straight lines, two of these straight lines are parallel to one another.

According to one configuration of the flat-shaped composite material, it is provided that the quadrangular gable surface has a front edge which adjoins the front surface and which is curved. Preferably, the front edge of the gable surface is curved, when viewed from the gable surface, in the direction of the front surface. In this way, the gable surface can be enlarged, which, for example, facilitates the attachment of dispensing elements with a larger diameter. A curved front edge of the gable also influences the shape of the front surface of the composite material and thus also the shape of the front side of a package manufactured from the composite material. In particular, a front edge curved in the direction of the front surface can achieve an outwardly-arched (convex) front side ("front panel") of the package. In addition to an appealing appearance, this also has the previously described technical advantage of improved air circulation between adjacently arranged packages, which reduces the risk of mould formation.

A further configuration of the flat-shaped composite material is characterised by two secondary fold lines, which run parallel to one another through the sleeve surface. Secondary fold lines are understood as fold lines which, in contrast to conventional fold lines, do not later form edges of the package, but are arranged between the edges of the package; for example, in the side surfaces. Secondary fold lines are used to generate a package sleeve from the composite material, which is preferably folded flat along two secondary fold lines in order to be stacked and transported in the most space-saving manner possible.

According to a further configuration of the flat-shaped composite material, it is provided that the sleeve surface has at least one stress-relief surface, which is arranged between the front surface and one of the two side surfaces. The stress-relief surface serves to create a smoothest possible transition between the front surface and the side surface. Preferably, the stress-relief surface extends over the entire height of the sleeve surface, i.e. from the base surfaces to the gable surfaces and therefore separates the front surface from the two side surfaces. The technical effect of the stress-relief surfaces is that the composite material needs to be folded or kinked less than a 90° edge of a cuboid package, since the transition from the front surface to the two side surfaces takes place through two less strongly kinked ("blunter") edges. This leads to less stresses on the composite material and in particular to a lower risk of cracked or broken fibres in the fibrous support layer (paper or cardboard layer) of the composite material. Preferably, the sleeve surface has two stress-relief surfaces, which are arranged between the front surface and each one of the two side surfaces. The stress-relief surfaces also ensure that a gap or free space between adjacent packages is created between packages arranged next to one another, in contrast to cuboid packages, in the region of the stress-relief surfaces, through which air can circulate. This has the advantage of reducing the risk of mould forming as a result of moisture. A further advantage of stress-relief surfaces can be seen in that the surfaces adjoining the stress-relief surfaces can be designed to be narrower and thus more stable, whereby an increased grip rigidity can be achieved when pouring out the filled package.

According to a further design of the flat-shaped composite material, it is provided that at least one stress-relief surface in the region of the base surfaces adjoins a quadrangular base surface and adjoins a triangular gable surface in the region of the gable surfaces. The triangular surfaces in the base and gable region are typically assigned to the side surfaces of a flat-shaped composite material and therefore adjoin the side surfaces of the package manufactured therefrom. The quadrangular surfaces in the base and gable region, on the other hand, are typically assigned to the front surface and the rear surface of a flat-shaped composite material and therefore adjoin the front side and the rear side of the package manufactured therefrom. By adjoining the stress-relief surface in the base region to a different surface than in the gable region, it is achieved that the stress-relief surface in its lower region is to be assigned to the front side of the package, while it is to be assigned to the side of the package in its upper region. The stress-relief surface therefore "wraps" around an (imaginary) vertical edge of the package. This design of the stress-relief surfaces has the advantage that the previously described technical effects (reduced stress on the composite material, improved air circulation) occur not only on one side of the package, but on two sides of the package. Alternatively or additionally, it can be provided that at least one stress-relief surface in the region of the base surfaces adjoins a triangular base surface and adjoins a quadrangular gable surface in the region of the gable surfaces. Preferably, the surfaces adjoining one another do not only touch each other in one point, but also adjoin each other in a linear manner, i.e. along a segment.

According to a further configuration of the flat-shaped composite material, it is provided that a first sleeve fold line, which is preferably curved at least in sections, is provided between at least one stress-relief surface and the adjoining front surface. By providing a fold line between the stress-relief surface and the front surface, a folding edge with a defined course is achieved, which facilitates the manufacture of the package. The folding edge also improves the structural properties of the package, in particular the rigidity, compared to an edge-free curved shape. The curved course of the sleeve fold line also makes it easier to create convex or concave surfaces, creating air gaps between adjacent packages which improve air circulation. It may be provided that a first sleeve fold line, which is preferably curved at least in sections, is provided in each case between both stress-relief surfaces and the adjoining front surface. It can also be provided that the first sleeve fold line runs continuously curved.

According to a further design of the flat-shaped composite material, it is provided that a second sleeve fold line, which is preferably curved at least in sections, is provided between at least one stress-relief surface and the adjoining side surface. As has already been explained in connection with the first sleeve fold line, a folding edge with a defined course is also achieved by the second sleeve fold line, which facilitates the manufacture of the package. The folding edge also improves the structural properties of the package, in particular the rigidity, compared to an edge-free curved shape. The curved course of the sleeve fold line also makes it easier to create convex or concave surfaces, creating air gaps between adjacent packages which improve air circulation. It may be provided that a second sleeve fold line, which is preferably curved at least in sections, is provided in each case between both stress-relief surfaces and the adjoining side surfaces. It can also be provided that the second sleeve fold line runs continuously curved.

In the case of a further configuration of the flat-shaped composite material, it is provided that a third sleeve fold line, which is preferably curved at least in sections, is provided between at least one side surface and the adjoining rear surface. As has already been explained in connection with the first and second sleeve fold line, a folding edge with a defined course is also achieved by the third sleeve fold line, which facilitates the manufacture of the package. The folding edge also improves the structural properties of the package, in particular the rigidity, compared to an edge-free curved shape. The curved course of the sleeve fold line also makes it easier to create convex or concave surfaces, creating air gaps between adjacent packages which improve air circulation. It may be provided that a third sleeve fold line, which is preferably curved at least in sections, is provided in each case between both side surfaces and the adjoining rear surfaces. It can also be provided that the third sleeve fold line runs continuously curved.

In regard to this configuration, it is also proposed that the third sleeve fold line has a plurality of sections, of which at least one section is curved and of which at least one section is straight. By providing straight sections in addition to curved sections in the third sleeve fold line, the manufacture of the package is facilitated.

According to a further design, it is provided that the third sleeve fold line has a plurality of sections, of which the section adjoining the base surfaces and the section adjoining the gable surfaces are straight. The use of straight sections adjoining the base surfaces and adjoining the gable surfaces is particularly advantageous, since in this way the use of simpler tools is possible to manufacture the bases and gables of the packages.

According to a further configuration, it is provided that the third sleeve fold line has a plurality of sections, of which at least two sections have opposite curvature directions. In particular, it can be provided that a section is curved in the direction of the rear surface and that a section is curved in the direction of the side surface. In this way, a package can be achieved which has both convex and concave surfaces. Preferably, the section of the third sleeve fold line curved in the direction of the side surface is arranged above the section of the third sleeve fold line curved in the direction of the rear surface. This leads to a wide, concave rear side of the package in the upper region, in particular in the upper half of the package. Since the packages preferably have a narrow, convex front side in their upper region, in particular in the upper half, a plurality of packages can be placed in front of or behind one another in a space-saving manner so that a good use of space is achieved. In addition, it can be achieved by opposite curvature directions that the filling volume reduced by the one curvature direction is compensated again by the other curvature direction such that the package height for a given package volume can remain unchanged.

According to a further design of the flat-shaped composite material, it is provided that the fibrous support layer of the composite material has a main fibre direction, which runs approximately at right angles to a longitudinal edge of the composite material running from the base surfaces to the gable surfaces. Paper and cardboard are materials made from pulp fibres. While the fibres are evenly distributed in all directions in traditional (manual) paper production, a targeted alignment of the fibres can be achieved in mechanical paper production. Since the paper has different mechanical properties in the direction of the fibres than transverse to the fibre direction (anisotropy), the orientation of the fibres can be used to obtain the optimal material properties for the respective application. The main fibre direction should be approximately at right angles to the two longitudinal edges of the composite material. Since the longitudinal edges run from the base region to the gable region (i.e. in the case of the package in the vertical direction), this means that the main fibre direction in the case of the package runs in the circumferential direction of the package, i.e. around the sleeve surface. This has the advantage that the cardboard fibres are broken in the case of creases in the longitudinal edges of the package (which run transverse to the fibre direction). During subsequent folding and forming, this leads to a package with sharply pronounced package edges and thus to improved package stability. In particular, in the case of a compression stress on the packages (e.g. in the case of multi-layer stacking on a pallet), there is a significant increase in stability compared to packages with fibres aligned in the longitudinal direction, since the packages only buckle at higher compression stresses.

The object described at the outset is also achieved through a package sleeve made of a composite material for manufacturing a package. The package sleeve comprises a sleeve surface, wherein the sleeve surface comprises a front surface, a first side surface, a second side surface, a first rear surface and a second rear surface, base surfaces, wherein the base surfaces comprise triangular base surfaces and quadrangular base surfaces, gable surfaces, wherein the gable surfaces comprise triangular gable surfaces and quadrangular gable surfaces, two secondary fold lines, which run parallel to one another through the sleeve surface, and a longitudinal seam, which connects two edge regions of the composite material to form a circumferential package sleeve, which is open both in the region of the base surfaces and in the region of the gable surfaces, wherein the base surfaces and the gable surfaces are arranged on opposite sides of the sleeve surface, and wherein the package sleeve is folded along both secondary fold lines. With regard to those properties of the package sleeve which are already present in the flat-shaped composite material, reference is made to the corresponding explanations. The package sleeve has a longitudinal seam which connects two edge regions of the composite material to form a circumferential package sleeve. The longitudinal seam allows a continuous package sleeve, closed in a circumferential direction, to be manufactured from a flat, in most cases rectangular, blank of the composite material. The longitudinal seam can, for example, be produced through adhesion and/or welding. Because of the longitudinal seam, such package sleeves are also referred to as longitudinally sealed package sleeves. The package sleeve is folded along both secondary fold lines, resulting in a front side and a rear side as well as an inner side and an outer side.

According to the invention, the package sleeve is characterised by at least one quadrangular gable surface with two small gable surface angles, which are smaller than 90°, with two large gable surface angles, which are greater than 90°, and with an angle sum, which is greater than 360°. This design of the gable achieves a gable surface whose shape deviates from a rectangular or square shape. The associated properties and advantages have already been explained and can be transferred from the flat-shaped composite material to the package sleeve in a corresponding manner.

According to one configuration of the package sleeve, it is provided that the package sleeve is manufactured from a flat-shaped composite material as described herein. Since the package sleeve is manufactured from one of the flat-shaped composite materials described above, many properties and advantages of the flat-shaped composite material also apply to the package sleeve, such that reference is made to the corresponding embodiments.

According to a further design of the package sleeve, it is provided that the composite material has at least one layer of paper or cardboard which is covered on the edge of the longitudinal seam running within the package sleeve. The layer made of paper or cardboard is preferably the support layer. The covering of the paper layer or cardboard layer has the purpose of preventing any contact between the contents of the package and this layer. This serves on the one hand to prevent liquid from leaking out through the non-liquid-tight paper layer or cardboard layer and on the other hand to protect the contents of the package against contamination through the paper layer or cardboard layer (for example pulp fibres).

Regarding this configuration, it is further proposed that the layer of paper or cardboard is covered by a sealing strip and/or by turning over the composite material in the region of the longitudinal seam. One possibility for achieving said covering involves the attachment of a separate sealing strip. The sealing strip can, for example, be made from the same material as the innermost layer of the composite material and can be adhered or welded to this layer. Another possibility for covering involves turning or folding over the composite material in the region of the longitudinal seam. In this way, not all layers, but only the innermost layer of the composite material now appears on the edge of the longitudinal seam running within the package sleeve. However, the innermost layer must in any case be made from a material which is suitable for contact with the contents of the package.

In a further design of the package sleeve, the composite material is stripped in the region of the longitudinal seam. A "stripped" composite material is understood to mean a composite material which has fewer layers in the stripped region than in the other regions.

Particularly in the region where a plurality of material layers overlap, stripping brings the advantage of a less pronounced increase in thickness. The use of stripped composite material is therefore particularly advantageous if the composite material is turned or folded over; for example, in the region of the longitudinal seam.

The object described at the outset is also achieved by a package made of a composite material, wherein the package is manufactured from a flat-shaped composite material as described herein, or wherein the package is manufactured from a package sleeve as described herein, and wherein the package is sealed in the region of the base surfaces and in the region of the gable surfaces. The package is characterised by at least one quadrangular gable surface with two small gable surface angles, which are smaller than 90°, with two large gable surface angles, which are greater than 90°, and with an angle sum, which is greater than 360°. This design of the gable achieves a gable surface whose shape deviates from a rectangular or square shape. The associated properties and advantages have already been explained and can be transferred from the composite material and the package sleeve to the package in a corresponding manner. The package can be manufactured either directly from a flat-shaped composite material or it can be manufactured from a package sleeve which has previously been manufactured from a flat-shaped composite material.

According to one configuration of the package, it is provided that the package has a fin seam in the region of the gable which is turned over in the direction of the front surface. This design enables, for example, a better drainage of moisture from the gable surface in the case of an oblique gable sloping forwards, since no "pocket" open at the top forms in which moisture could collect. This design also allows more space to be achieved for a dispenser sealed from the inside.

According to a further design of the package, it is provided that the package has a gable which is approximately trapezoidal. The trapezoidal shape of the gable has the advantage that one of the two parallel sides or edges (preferably the front edge of the gable) is shorter than the opposite side or edge (preferably the rear edge of the gable), unlike a rhombus in which the opposite sides are the same length. This makes it easy to grip larger-volume packages from the front with one hand.

A further configuration of the package provides that the package has an oblique gable. In particular, it can be provided that the gable of the package falls forwards, i.e. is lower in the region of the front side of the package than in the region of the rear side of the package. Due to the oblique course of the gable, it can be achieved that a dispensing element arranged in the region of the gable impairs the stacking of packages less than in packages with a flat gable. This is due to the fact that the dispensing element does not necessarily form the highest point of the package in packages with an oblique gable, unlike packages with a flat gable. In addition, better drainage of moisture from the gable surface can be achieved.

According to a further design of the package, it is provided that the package is convex in the region of the front surface and/or is concave in the region of the rear surfaces. In particular, it can be provided that the package is convex in the region of the front surface in the upper region, in particular in the upper half, and/or is concave in the region of the rear surfaces in the upper region, in particular in the upper half. Through the combination of convex front side and concave rear side, the packages can be arranged in front of or behind one another in a space-saving manner despite their visually complex design.

Finally, according to a further configuration of the package, it is provided that the package has a stress-relief surface which lies in a plane in sections with the front surface and which lies in a plane in sections with a side surface. As has already been described in connection with the flat-shaped composite material, this configuration has the consequence that the stress-relief surface winds around a (fictitious) edge from one side of the package (e.g. the front side) in the direction of another side of the package. The stress-relief surface thus serves to create a smoothest possible transition between the front surface and the side surface. Preferably, the stress-relief surface extends over the entire height of the sleeve surface, i.e. from the base surfaces to the gable surfaces and therefore separates the front surface from the two side surfaces. The technical effect of the stress-relief surfaces is that the composite material needs to be folded or kinked less than a 90° edge of a cuboid package, since the transition from the front surface to the two side surfaces takes place through two less strongly kinked ("blunter") edges. This leads to less stresses on the composite material and in particular to a lower risk of cracked or broken fibres in the paper or cardboard layer of the composite material.

BRIEF DESCRIPTION OF THE DRAWINGS

The invention will be explained in more detail below with reference to a drawing which simply represents a preferred exemplary embodiment, in which:

FIG. 1A: shows a flat-shaped composite material known from the prior art for folding a package sleeve in a top view, FIG. 3B: shows the package sleeve from FIG. 3A in a rear view.

DESCRIPTION OF THE INVENTION

Figure 1B:
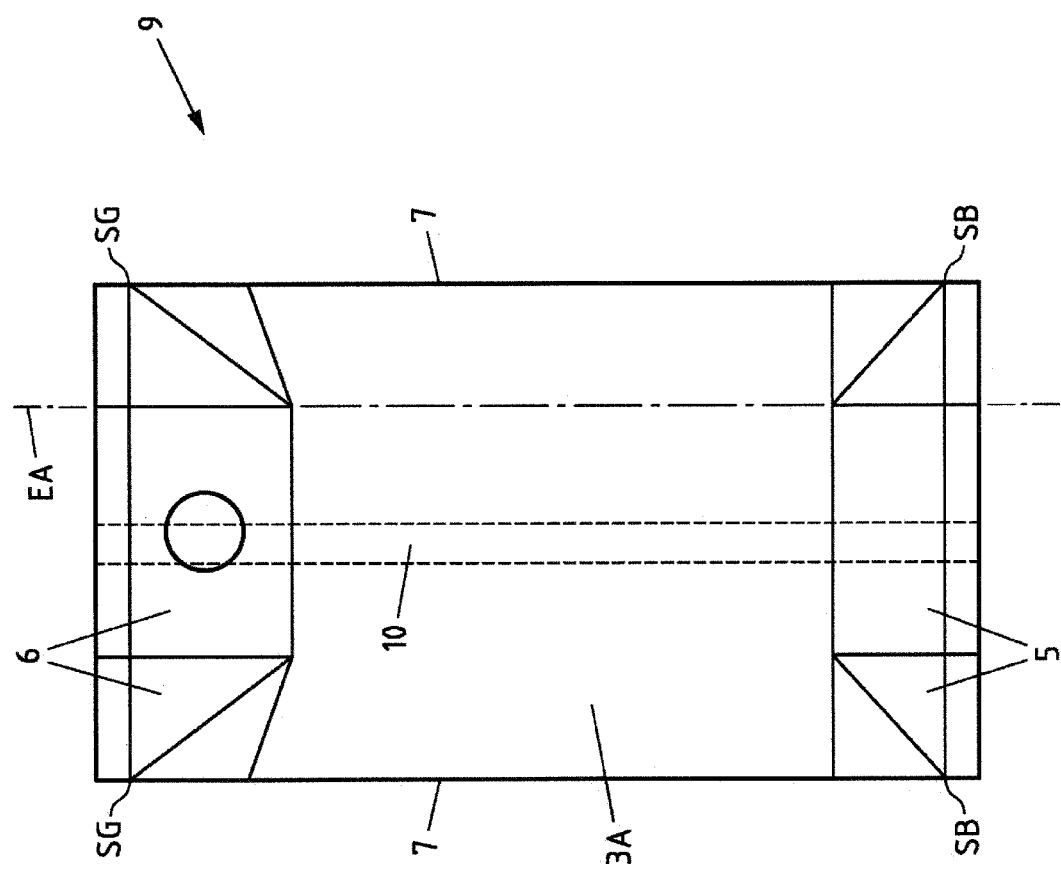
FIG. 1B: shows a package sleeve known from the prior art, formed from the flat-shaped composite material shown in FIG. 1A, in a front view.

FIG. 1A shows a flat-shaped composite material 1 known from the prior art, from which a package sleeve can be formed, in a top view. The flat-shaped composite material 1 can comprise a plurality of layers of different materials; for example, paper, cardboard, plastic or metal, in particular aluminium. The composite material 1 has a plurality of fold lines 2 which are intended to facilitate the folding of the composite material 1 and divide the composite material 1 into a plurality of surfaces. The composite material 1 can be divided into a sleeve surface 3, a sealing surface 4, base surfaces 5 and gable surfaces 6. A package sleeve can be formed from the composite material 1 by the composite material 1 being folded in such manner that the sealing surface 4 is connected, in particular welded, to the opposite edge region of the sleeve surface 3. With the exception of the sealing surface 4, the sleeve surface 3 extends over the entire width of the composite material 1. The composite material 1 has two secondary fold lines 7 in the region of the sleeve surface 3. The two secondary fold lines 7 are straight and run parallel to one another. Moreover, the secondary fold lines 7 run through a contact point SB of three adjacent triangular surfaces 8 of the base surface 5 and through a contact point SG of three adjacent triangular surfaces 8 of the gable surfaces 6. The sleeve surface 3 is divided by the secondary fold lines 7 into an inner partial region 3A and two outer partial regions 3B. The inner partial region 3A lies between two secondary fold lines 7 and the outer partial regions 3B lie next to and outside of the two secondary fold lines 7.

The base surfaces 5 form four corner points E5 and the gable surfaces 6 form four corner points E6. The corner points E5, E6 are corner points of the package to be manufactured from the composite material 1. Each corner point E5 of a base surface 5 is assigned a corresponding corner point E6 of a gable surface 6 which is in each case the corner point E6 which is arranged above this corner point E5 when the package is standing up. A corner axis EA runs through two corner points E5, E6 assigned to each other which, in a conventional cuboid package, would correspond to a vertical package edge. Four corner axes EA are therefore present in the composite material 1 shown in FIG. 1A, just like in the package sleeve manufactured therefrom and the package manufactured therefrom (for reasons of clarity, only one corner axis EA is in each case drawn in). No fold lines are provided between the corner points E5 of the base surfaces 5 and the corner points E6 of the gable surfaces 6 assigned thereto, i.e. along the corner axes EA.

FIG. 1B shows a package sleeve 9 known from the prior art, which is formed from the flat-shaped composite material 1 shown in FIG. 1A, in a front view. The regions of the package sleeve 9 already described in connection with FIG. 1A are provided with corresponding reference numerals in FIG. 1B. The package sleeve 9 has been created from the composite material 1 in two steps: First, the composite material 1 is folded along the two secondary fold lines 7. The two partial regions 3B (left) and 3B (right) of the sleeve surface 3 are then connected together, in particular welded, in the region of the sealing surface 4, resulting in a longitudinal seam 10 (hidden in FIG. 1B). The package sleeve 9 therefore has a circumferential structure, which is closed in a circumferential direction, with an opening in the region of the base surfaces 5 and with an opening in the region of the gable surfaces 6. The inner partial region 3A of the sleeve surface 3 is visible in the front view, both sides of which are delimited by the secondary fold lines 7. The remaining partial regions 3B of the sleeve surface 3 are on the rear side of the package sleeve 9 and therefore hidden in FIG. 1B.

Figure 1C:
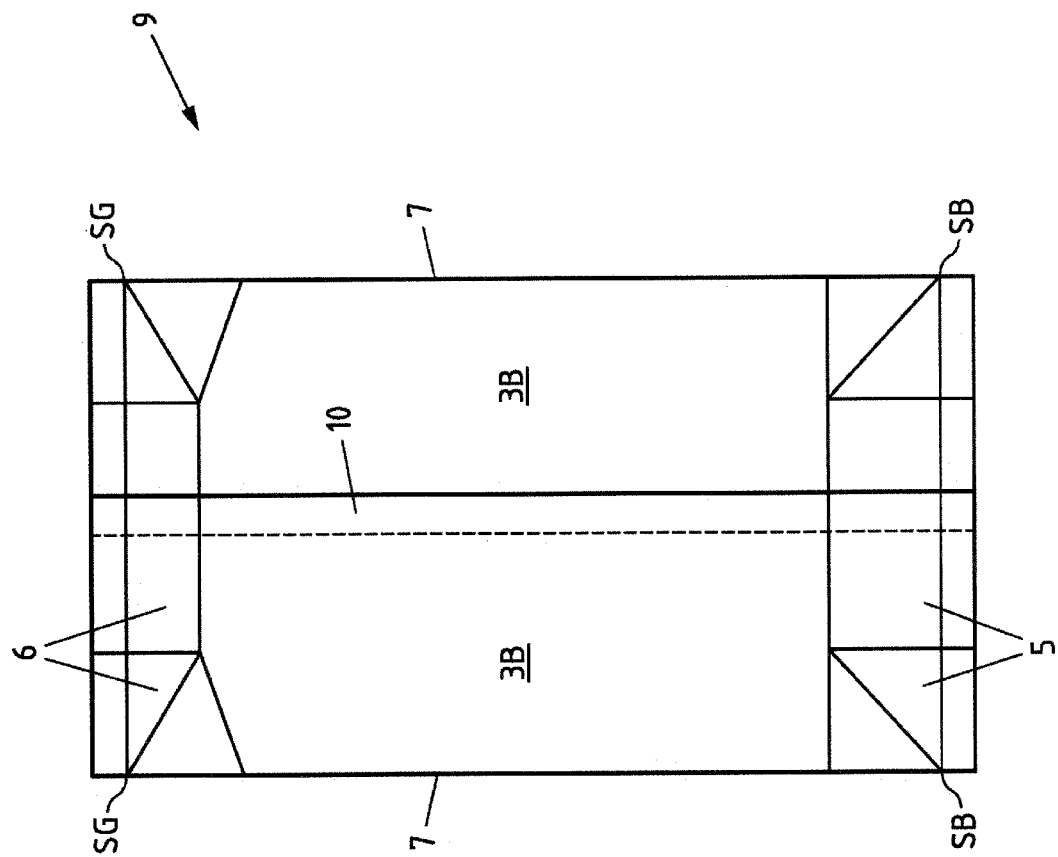
FIG. 1C: shows the package sleeve from FIG. 1B in a rear view.

FIG. 1C is a rear view of the package sleeve 9 from FIG. 1B. The regions of the package sleeve 9 already described in connection with FIG. 1A and FIG. 1B are provided with corresponding reference numerals in FIG. 1C. Both external partial regions 3B of the sleeve surface 3 are visible in the rear view. They are connected together by the longitudinal seam 10 and are delimited on both sides by the secondary fold lines 7. The inner partial region 3A of the sleeve surface 3 is on the front side of the package sleeve 9 and is therefore hidden in FIG. 1C.

Figure 1E:
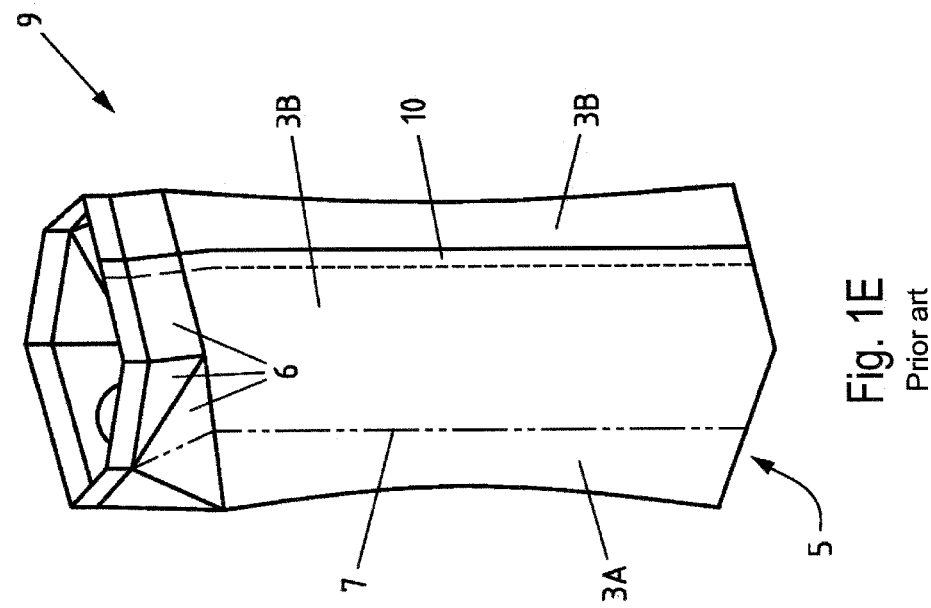
FIG. 1E: shows the package sleeve from FIG. 1D with sealed base.
Figure 1D:
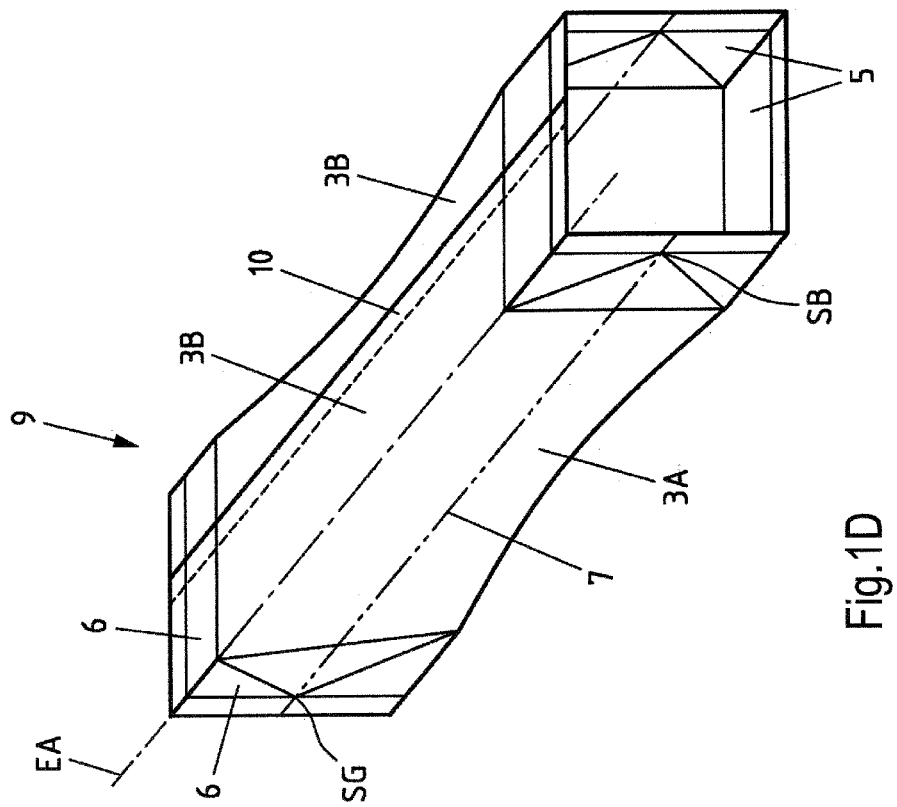
FIG. 1D: shows the package sleeve from FIG. 1B and FIG. 1C in its unfolded state.

FIG. 1D shows the package sleeve 9 from FIG. 1B and FIG. 1C in its unfolded state. The regions of the package sleeve 9 already described in connection with FIG. 1A to FIG. 1C are provided with corresponding reference numerals in FIG. 1D. The unfolded state is achieved by folding back the package sleeve 9 along the secondary fold lines 7 running through the sleeve surface 3. The sleeve is folded back by around 180°. The result of this folding back along the secondary fold lines 7 is that the two partial regions 3A, 3B of the sleeve surface 3 adjoining the secondary fold line 7 no longer lie on top of one another, but are arranged in the same plane. The package sleeve 9 is therefore only in its flat state (FIG. 1B, FIG. 1C) along the secondary fold lines 7; in the unfolded state (FIG. 1D), on the other hand, the package sleeve 9 (like the package to be manufactured therefrom) is no longer folded along the secondary fold lines 7. Therefore, the designation "secondary" fold lines 7.

FIG. 1E shows the package sleeve 9 from FIG. 1D with sealed base. The regions of the package sleeve 9 already described in connection with FIG. 1A to FIG. 1D are provided with corresponding reference numerals in FIG. 1E. The pre-folded state denotes (as in FIG. 1D) a state in which the two fold lines 2 in the region of the gable surfaces 6 have been pre-folded. The base surfaces 5, on the other hand, are already completely folded and welded such that the package sleeve 9 has a sealed base.

Figure 1G:
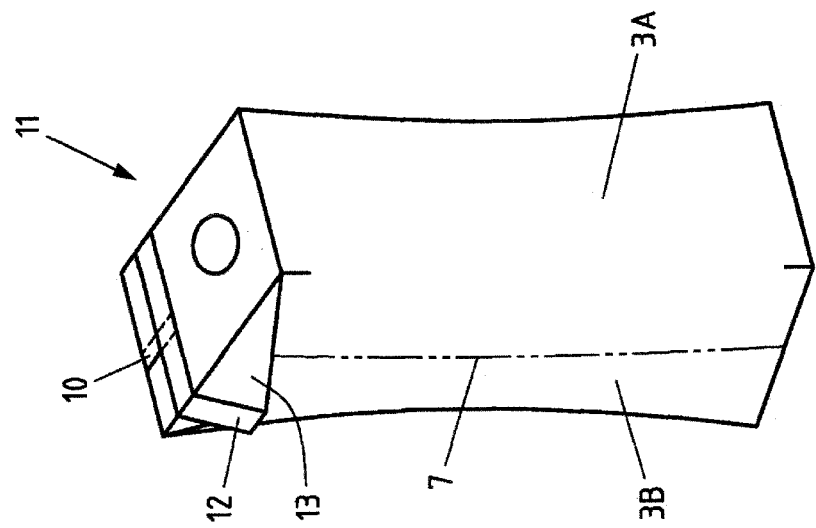
FIG. 1G: shows the package from FIG. 1F with ears applied.
Figure 1F:
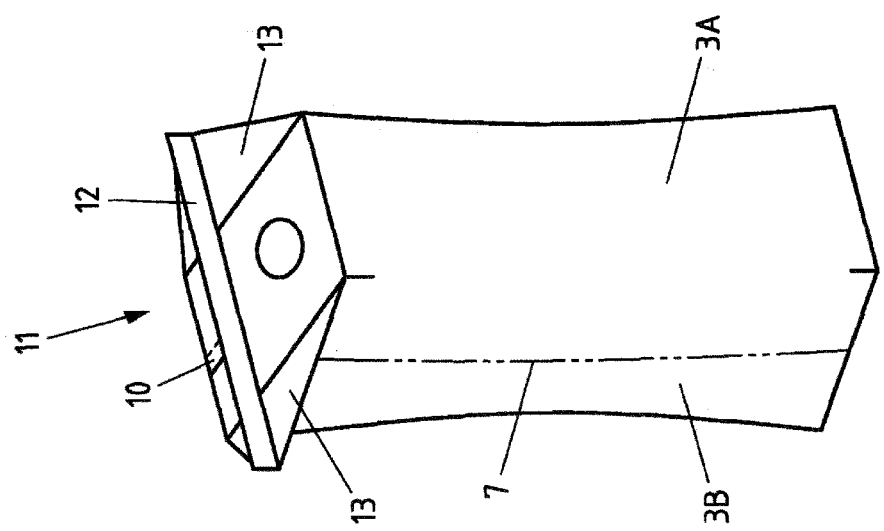
FIG. 1F: a package, which is formed from the package sleeve shown in FIG. 1B, after welding.

FIG. 1F shows a package 11, which is formed from the package sleeve 9 shown in FIG. 1B, after welding. The regions of the package 11 already described in connection with FIG. 1A to FIG. 1E are provided with corresponding reference numerals in FIG. 1F. The package 11 is shown after welding, i.e. in the filled and sealed state. After sealing, a fin seam 12 is created in the region of the base surfaces 5 and in the region of the gable surfaces 6. While the fin seam 12 has already been applied to the package 11 in the region of the base surfaces 5, the fin seam 12 still protrudes from the package 11 in the region of the gable surfaces 6. Partial regions of the gable surfaces 6 are folded outwards during the pre-folding (see FIG. 1E) and form protruding regions of excess material which are also referred to as "ears" 13 and in a later manufacturing step are applied against the package 11; for example, by an adhesion process. In FIG. 1F, the ears 13 still protrude from the package 11 and are applied in a later manufacturing step; for example, by an adhesion process.

FIG. 1G shows the package 11 from FIG. 1F with applied ears. The regions of the package 11 already described in connection with FIG. 1A to FIG. 1F are provided with corresponding reference numerals in FIG. 1G. The upper ears 13 arranged in the region of the gable surface 6 are folded down and applied flat to the sleeve surface 3 of the package 11. Preferably, the upper ears 13 are adhered or welded to the sleeve surface 3.

Figure 2A:
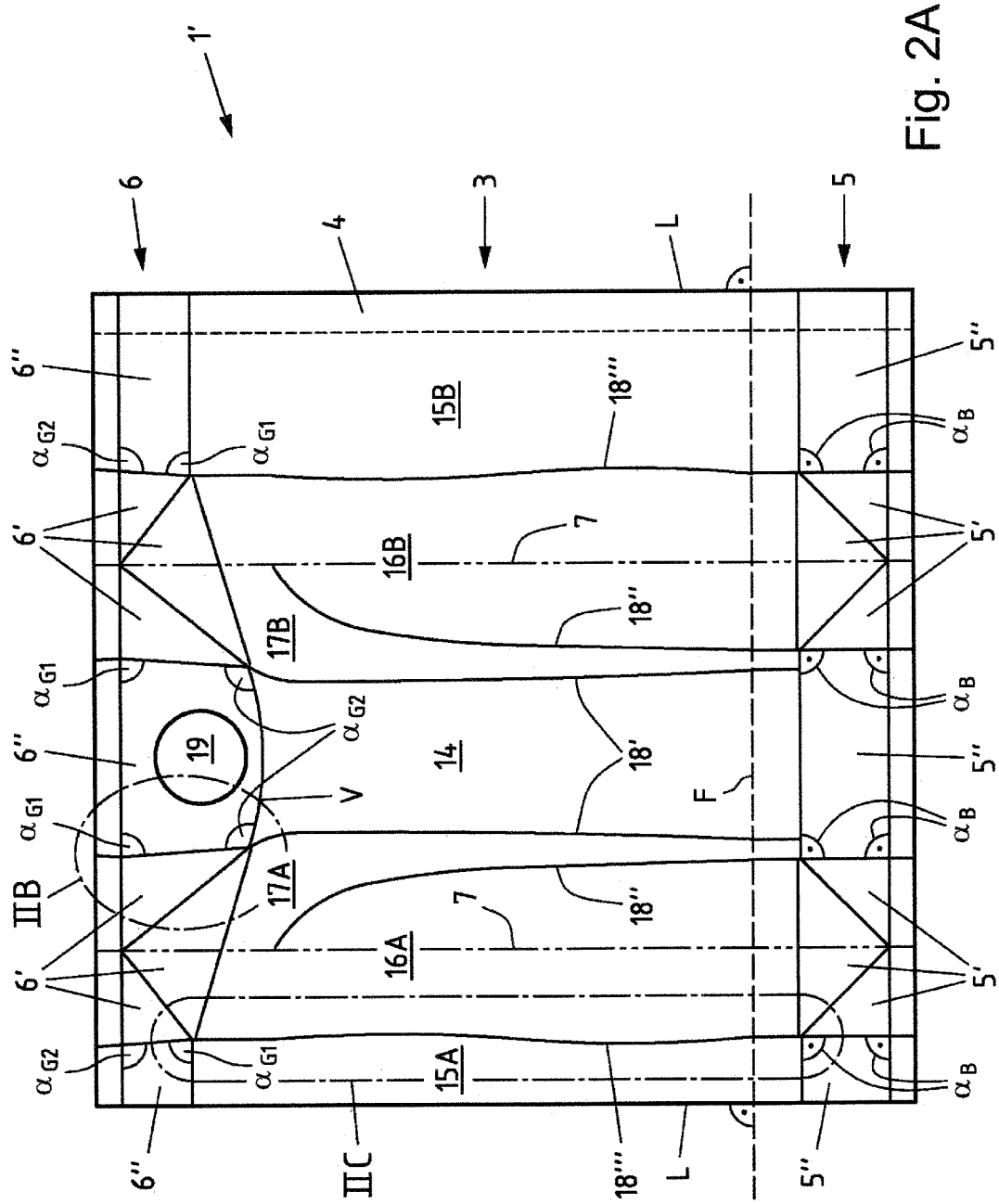
FIG. 2A: shows a flat-shaped composite material according to the invention for folding a package sleeve in a top view.

FIG. 2A shows a flat-shaped composite material 1' according to the invention for folding a package sleeve in a top view. The regions of the composite material 1' already described in connection with FIG. 1A to FIG. 1G are provided with corresponding reference numerals in FIG. 2A. The base surfaces 5 of the composite material 1' can be divided into triangular base surfaces 5' and into quadrangular base surfaces 5". The triangular base surfaces 5' form ears 13 (see FIG. 1F), which are folded inwards or outwards and applied to the package; on the other hand, the quadrangular base surfaces 5" determine the shape of the base. In the composite material 1' shown FIG. 2A, the corners of the quadrangular base surfaces 5" are approximately at right angles ($\alpha_B$=90°), so that a package manufactured from this composite material 1' also has an approximately rectangular, in particular approximately square base. In a corresponding manner, the gable surfaces 6 of the composite material 1' can be divided into triangular gable surfaces 6' and into quadrangular gable surfaces 6". The triangular gable surfaces 6' form ears 13 (see FIG. 1F), which are folded inwards or outwards and applied to the package; on the other hand, the quadrangular gable surfaces 6" determine the shape of the gable. In the composite material 1' shown in FIG. 2A, the corners of the quadrangular gable surfaces 6" are not right-angled, but rather somewhat smaller ($\alpha_{G1}$<90°) or slightly larger ($\alpha_{G2}$>90°) than 90°, resulting in an approximately trapezoidal shape. A package manufactured from this composite material 1' therefore also has an approximately trapezoidal gable. Preferably, the small gable surface angles $\alpha_{G1}$ lie in the range between 80° and 90°, while the large gable surface angles $\alpha_{G2}$ lie in the range between 90° and 100°. The side of the quadrangular gable surface 6", which adjoins the front surface 14, is also referred to as the front edge V. The front edge V is preferably curved in the direction of the front surface 14.

The sleeve surface 3 of the composite material 1' shown in FIG. 2A has a plurality of fold lines which divides the sleeve surface 3 into a plurality of surfaces. The sleeve surface 3 comprises a front surface 14, a first rear surface 15A and a second rear surface 15B, a first side surface 16A and a second side surface 16B, a first stress-relief surface 17A and a second stress-relief surface 17B. The front surface 14 adjoins the quadrangular base surface 5" in the base region and adjoins the quadrangular, trapezoidal gable surface 6" in the gable region. The front surface 14 laterally adjoins the first stress-relief surface 17A and the second stress-relief surface 17B. The two stress-relief surfaces 17A, 17B also adjoin the quadrangular base surface 5" in the base region (i.e. like the front surface 14); however, the two stress-relief surfaces 17A, 17B each adjoin one of the triangular gable surfaces 6' in the gable region. The two side surfaces 16A, 16B adjoin one of the triangular base surfaces 5' in the base region and they adjoin one of the triangular gable surfaces 6' in the gable region. The two side surfaces 16A, 16B laterally each adjoin one of the two stress-relief surfaces 17A, 17B on their inner sides and each adjoin one of the two rear surfaces 15A, 15B on their outer sides (the first side surface 16A adjoins the first rear surface 15A and the first stress-relief surface 17A and the second side surface 16B adjoins the second rear surface 15B and the second stress-relief surface 17B). The two rear surfaces 15A, 15B adjoin the quadrangular base surface 5" in the base region and adjoin the quadrangular gable surface 6" in the gable region. The two rear surfaces 15A, 15B laterally each adjoin one of the two side surfaces 16A, 16B on their inner sides (the first rear surface 15A adjoins the first side surface 16A and the second rear surface 15B adjoins the second side surface 16B).

In the flat-shaped composite material 1' shown in FIG. 2A, the sleeve surface 3 has a plurality of sleeve fold lines 18', 18", 18'". The first sleeve fold lines 18' laterally delimit the front surface 14 and form the boundaries between the front surface 14 and the two stress-relief surfaces 17A, 17B. Preferably, the two first sleeve fold lines 18' are curved at least in sections. The two second sleeve fold lines 18" form the boundaries between the two stress-relief surfaces 17A, 17B and the two side surfaces 16A, 16B. Preferably, the two second sleeve fold lines 18" are also curved at least in sections. The two third sleeve fold lines 18'" form the boundaries between the two stress-relief surfaces 17A, 17B and the two rear surfaces 15A, 15B. Preferably, the two third sleeve fold lines 18'" are also curved at least in sections. The composite material 1' also has a paper or cardboard layer, whose main fibre direction F runs transversely (i.e. at right angles to two longitudinal edges L running from the base surfaces 5 through the sleeve surface 3 to the gable surfaces 6) through the surfaces 14, 15A, 15B, 16A, 16B, 17A, 17B forming the sleeve surface and thus runs in the circumferential direction of the package in a package manufactured from composite material 1'. Furthermore, the composite material 1' has a weakening zone 19 which can be used to define the position of a dispensing element. The weakening zone 19 can be designed as a coated hole or as a hole punched completely through the composite material 1'.

Figure 2B:
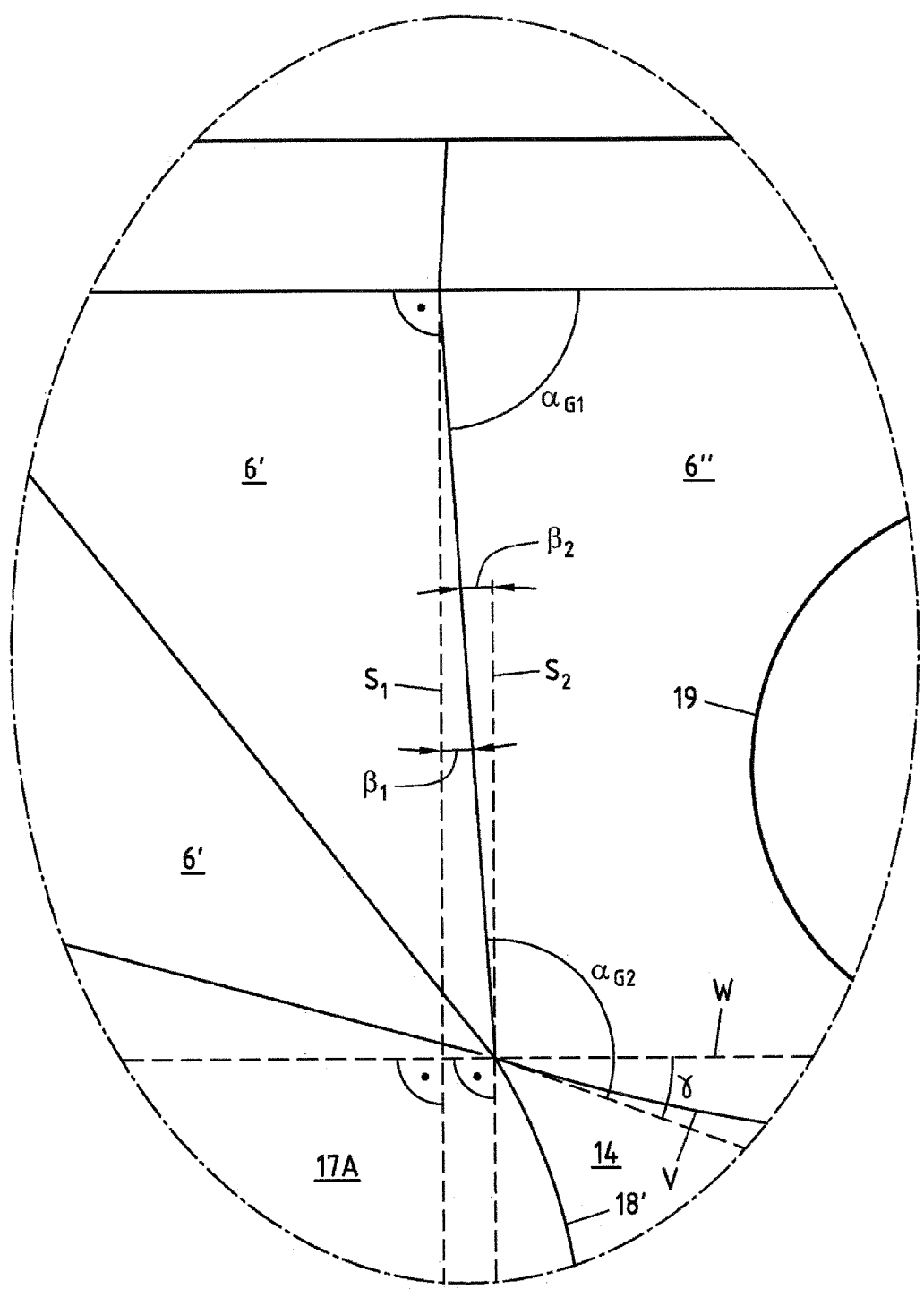
FIG. 2B: shows a first region of the flat-shaped composite material from FIG. 2A in enlarged view.

FIG. 2B shows a first region of the composite material 1' from FIG. 2A in enlarged view. The regions of the composite material 1' already described in connection with FIG. 1A to FIG. 2A are provided with corresponding reference numerals in FIG. 2B. The first region of the composite material 1' represented in FIG. 2B relates to the region of the gable surfaces 6, in particular the region of the gable surface angles $\alpha_{G1}$, $\alpha_{G2}$. As already previously described, the corners of the quadrangular gable surfaces 6" are not at right angles, but rather slightly smaller ($\alpha_{G1}$<90°) or slightly larger ($\alpha_{G2}$>90°) than 90°. For the rear (assigned to the rear side of the package) gable surface angles $\alpha_{G1}$, the deviation from a right angle is due to the fact that one of the two fold lines adjoining the angle $\alpha_{G1}$ does not run at right angles to the edge of the composite material 1', but is inclined by an angle $\beta_1$ with respect to a vertical $S_1$ ($\alpha_{G1}$=90°−$\beta_1$). For the front (assigned to the front side of the package) gable surface angles $\alpha_{G1}$, the deviation from a right angle has two reasons: firstly, one of the two fold lines adjoining the angle $\alpha_{G2}$ does not run at right angles to the edge of the composite material 1', but inclined by an angle $\beta_2$ with respect to a vertical $S_2$. Secondly, the front edge V also adjoining the angle $\alpha_{G2}$ does not run straight, but curved in the direction of the front surface 14, wherein the front edge V (or a tangent, which touches the front edge V in the region of the corner or the angle $\alpha_{G2}$) is inclined by an angle $\gamma$ with respect to a horizontal W (which runs parallel to the upper edge of the composite material 1') ($\alpha_{G2}$=90°+$\beta_2$+$\gamma$). The angle $\beta_1$ corresponds to the angle $\beta_2$; both angles are preferably in the range between 2° and 6°. The two rear gable surface angles $\alpha_{G1}$ can therefore, for example, have an angle of approx. 86°. The angle γ is preferably in the range between 15° and 25°. The two front gable surface angles $\alpha_{G2}$ can therefore, for example, have an angle of approximately 113°. From the described design, in particular from the curved front edge V, it follows that the angle sum of the quadrangular gable surface 6" is greater than 360° ($2*\alpha_{G1}+2*\alpha_{G2}>360°$).

Figure 2C:
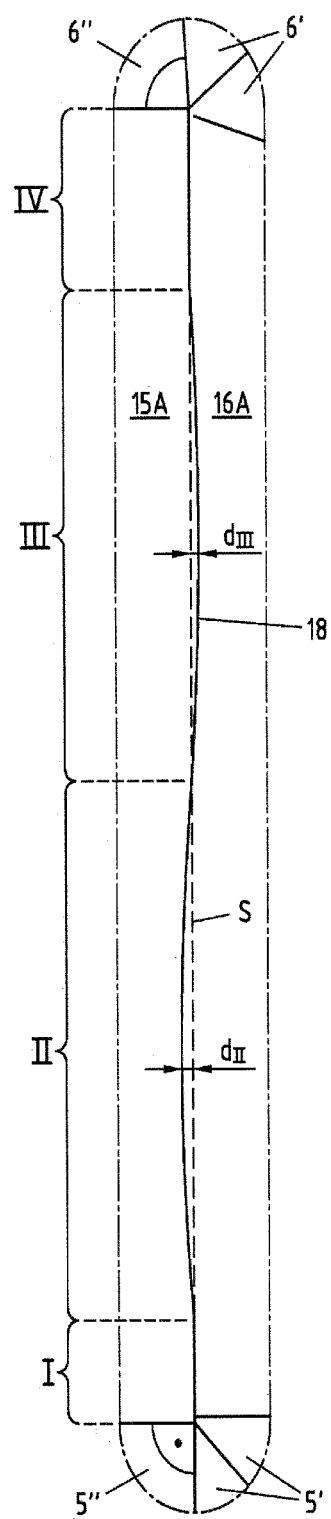
FIG. 2C: shows a second region of the flat-shaped composite material from FIG. 2A in enlarged view.

FIG. 2C shows a second region of the flat-shaped composite material 1' from FIG. 2A in enlarged view. The regions of the composite material 1' already described in connection with FIG. 1A to FIG. 2B are provided with corresponding reference numerals in FIG. 2C. The second region of the composite material 1' represented in FIG. 2C relates to the region of the third sleeve fold line 18''', which separates the side surfaces 16A, 16B from the rear surfaces 15A, 15B. The third sleeve fold line 18''' arranged between the side surfaces 16A, 16B and the adjoining rear surfaces 15A, 15B has four sections I-IV: the first section I adjoins the base surfaces 5 and runs straight. The second section II adjoins the first section I and runs curved (in the direction of the rear surfaces 15A, 15B). As a result of the curvature, there is a maximum distance $d_{II}$ between the third sleeve fold line 18''' and a vertical S, which can lie in the range between 0.5 mm and 2.5 mm. The third section III adjoins the second section II and runs curved (in the direction of the side surfaces 16A, 16B). As a result of the curvature, there is a maximum distance $d_{III}$ between the third sleeve fold line 18''' and the vertical S, which can lie in the range between 0.5 mm and 2.5 mm. The second section II and the third section III therefore have opposite curvatures or curvature directions. The fourth section IV adjoins the third section III and the gable surfaces 6 and runs straight. The third sleeve fold line 18''' therefore runs straight in sections (in the section I adjoining the base surfaces 5 and in the section IV adjoining the gable surfaces 6) and curved in sections (in the two "centre" sections II, III).

Figure 3A:
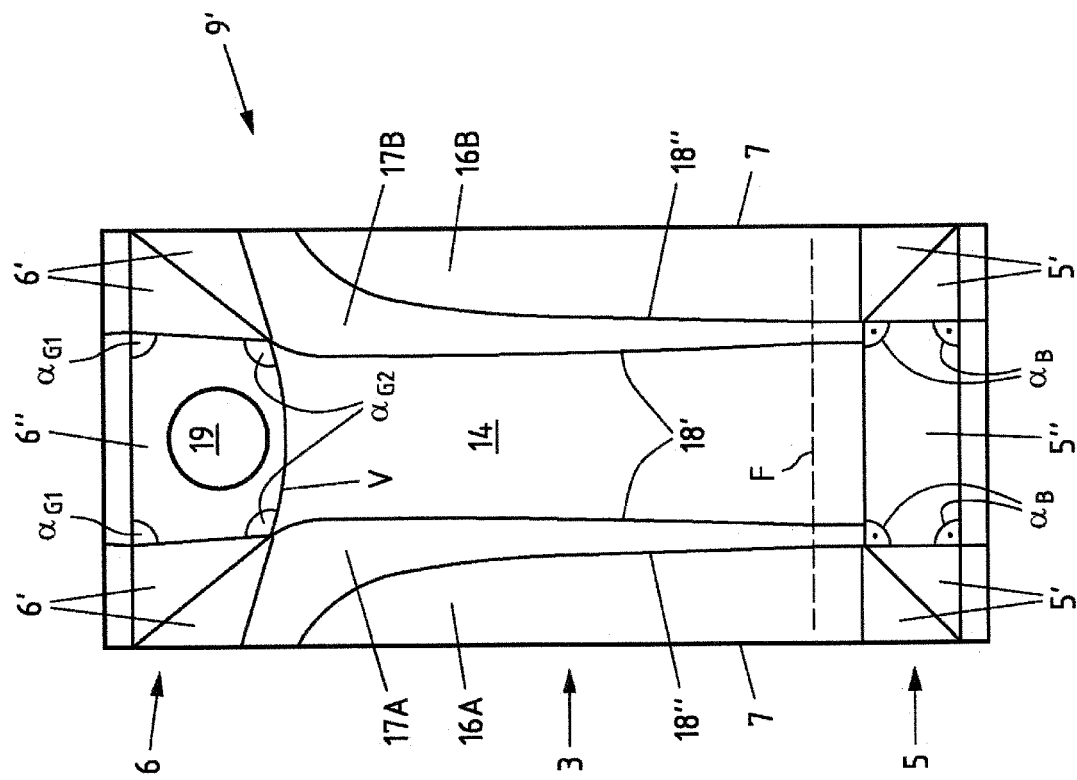
FIG. 3A: shows a package sleeve according to the invention, which is formed from the flat-shaped composite material shown in FIG. 2A, in a front view.

FIG. 3A shows a package sleeve 9' according to the invention, which is formed from the flat-shaped composite material 1' shown in FIG. 2A, in a front view. The regions of the package sleeve 9' already described in connection with FIG. 1A to FIG. 2C are provided with corresponding reference numerals in FIG. 3A. The package sleeve 9' was created from the composite material 1' in two steps: firstly, the composite material 1' is folded along the two secondary fold lines 7. The first rear surface 15A and the second rear surface 15B are then connected together, in particular welded, in the region of the sealing surface 4, whereby a longitudinal seam 10 (hidden in FIG. 3A) results. The package sleeve 9' therefore has a circumferential structure, which is closed in a circumferential direction, with an opening in the region of the base surfaces 5 and with an opening in the region of the gable surfaces 6.

The front view shows the front surface 14, the two stress-relief surfaces 17A, 17B and (partially) the two side surfaces 16A, 16B. The rear surfaces 15A, 15B are on the rear side of the package sleeve 9' and are therefore hidden in FIG. 3A.

FIG. 3B shows the package sleeve 9' from FIG. 3A in a rear view. The regions of the package sleeve 9' already described in connection with FIG. 1A to FIG. 3A are provided with corresponding reference numerals in FIG. 3A. In the rear view, the two rear surfaces 15A, 15B are visible, which are connected to one another by the longitudinal seam 10 and which are delimited on both sides by the third sleeve fold lines 18'''. In addition, the two side surfaces 16A, 16B are (partially) discernible. The front surface 14 and the two stress-relief surfaces 17A, 17B are on the front side of the package sleeve 9' and are therefore hidden in FIG. 3B.

Figure 4A:
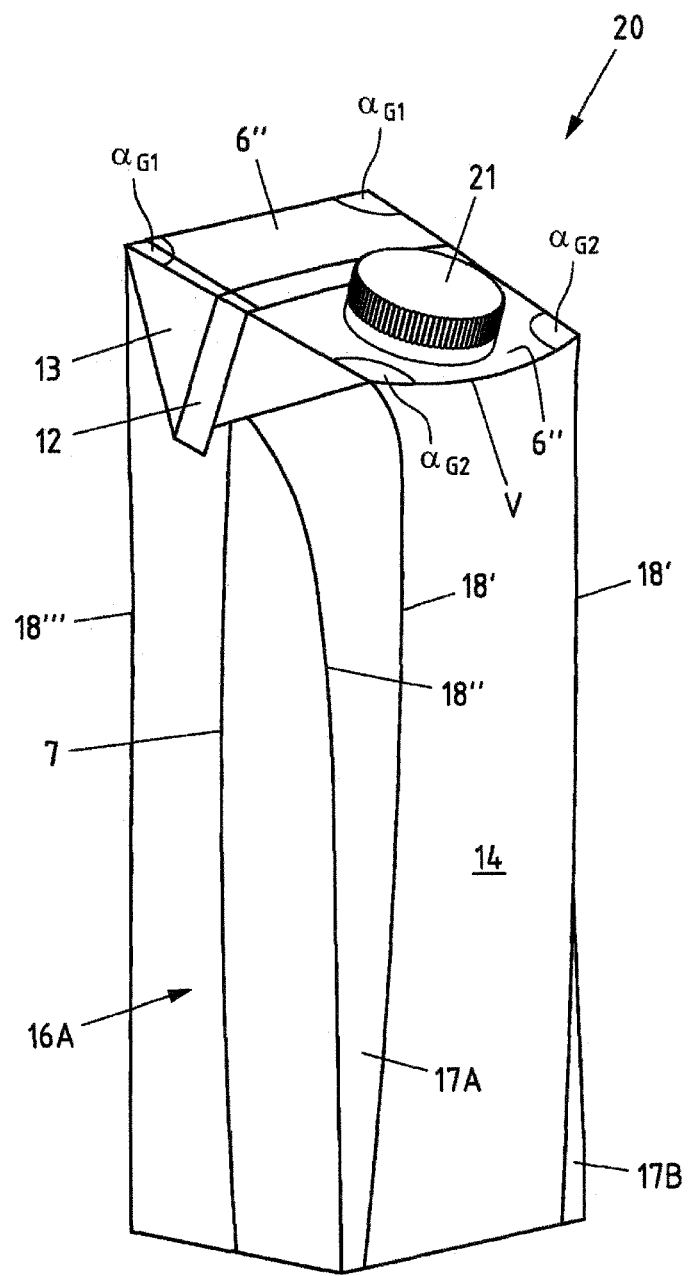
FIG. 4A: shows a package according to the invention, which is formed from the package sleeve shown in FIG. 3, in perspective view.

FIG. 4A shows a package 20 according to the invention, which is formed by the package 9' shown in FIG. 3, in perspective view. The regions of the package 20 already described in connection with FIG. 1A to FIG. 3B are provided with corresponding reference numerals in FIG. 4A. In FIG. 4A, it is particularly well recognisable that the stress-relief surface 17A (as well as stress-relief surface 17B not shown) is to be assigned to the front side of the package 20 in the region of the base, while the stress-relief surface 17A is to be assigned to the left side of the package 20 in the region of the gable (the stress-relief surface 17B not shown is accordingly to be assigned to the right side of the package 20 in the region of the gable). The stress-relief surfaces 17A, 17B thus "wrap" around a (fictitious) edge of the package 20 from the front side of the package 20 in the direction of one side of the package. The stress-relief surfaces 17A, 17B therefore form a transition from the front side of the package 20 (where they adjoin the front surface 14) to the two sides of the package 20 (where they adjoin the two side surfaces 16A, 16B). In FIG. 4A, it is also discernible that the package 20 has an oblique gable ("oblique gable") on which a screw cap 21 is arranged. The trapezoidal design of the gable is also discernible, which is achieved in that the quadrangular gable surfaces 6" have angles deviating from 90° (in FIG. 4A, the two small gable surface angles $\alpha_{G1}$ adjoining the rear surfaces 15A, 15B have an angle of <90° and the two large gable surface angles $\alpha_{G2}$ adjoining the front surface 14 have an angle of >90°). In addition, it is clearly discernible in FIG. 4A that both the first sleeve fold lines 18' and the second sleeve fold lines 18" as well as the third sleeve fold lines 18''' are curved.

Figure 4B:
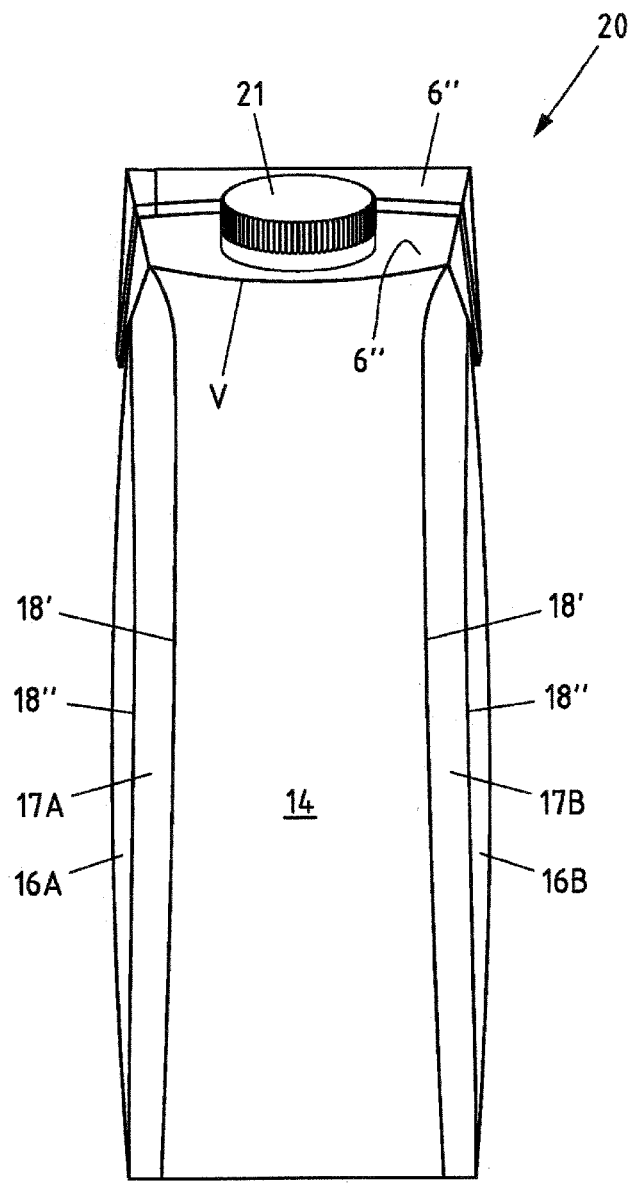
FIG. 4B: shows the package from FIG. 4A in a front view.

FIG. 4B shows the package 20 from FIG. 4A in a front view. The regions of the package 20 already described in connection with FIG. 1A to FIG. 4A are provided with corresponding reference numerals in FIG. 4B. The trapezoidal design of the gable is particularly easily discernible in FIG. 4B. In addition, the curved course of the first sleeve fold lines 18' and the second sleeve fold lines 18" is clearly visible.

Figure 4C:
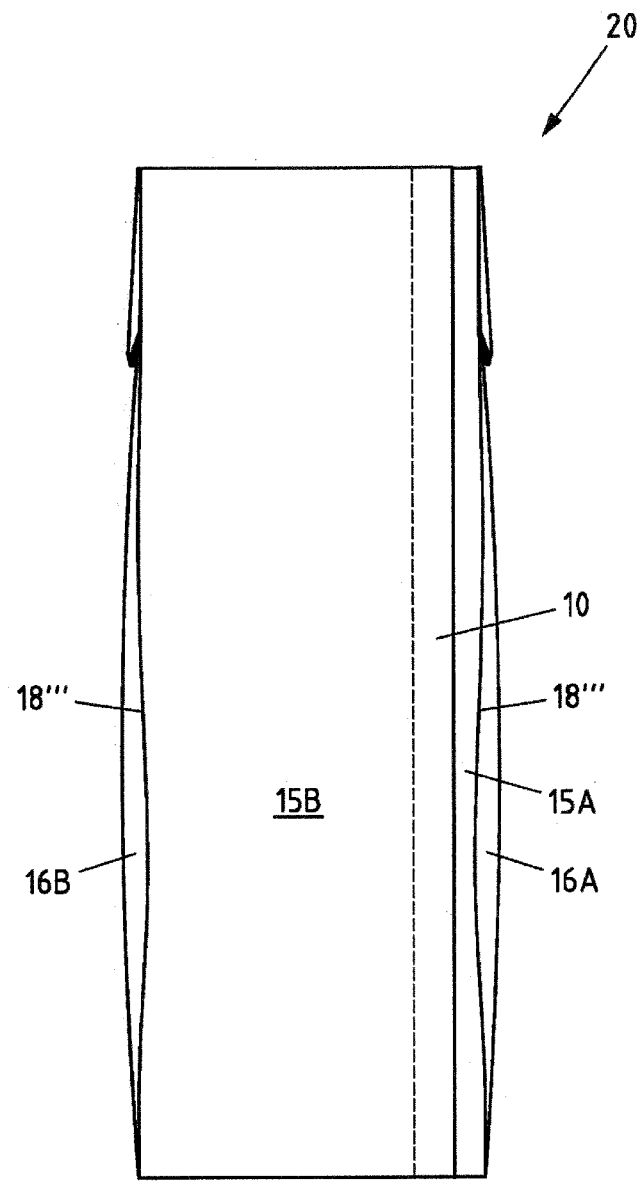
FIG. 4C: shows the package from FIG. 4A in a rear view.

FIG. 4C shows the package 20 from FIG. 4A in a rear view. The regions of the package 20 already described in connection with FIG. 1A to FIG. 4B are provided with corresponding reference numerals in FIG. 4C. The composition of the rear side of the package 20 from the two rear surfaces 15A, 15B is particularly easily discernible in FIG. 4C. In addition, the curved course of the third sleeve fold lines 18''' is clearly visible.

Figure 4D:
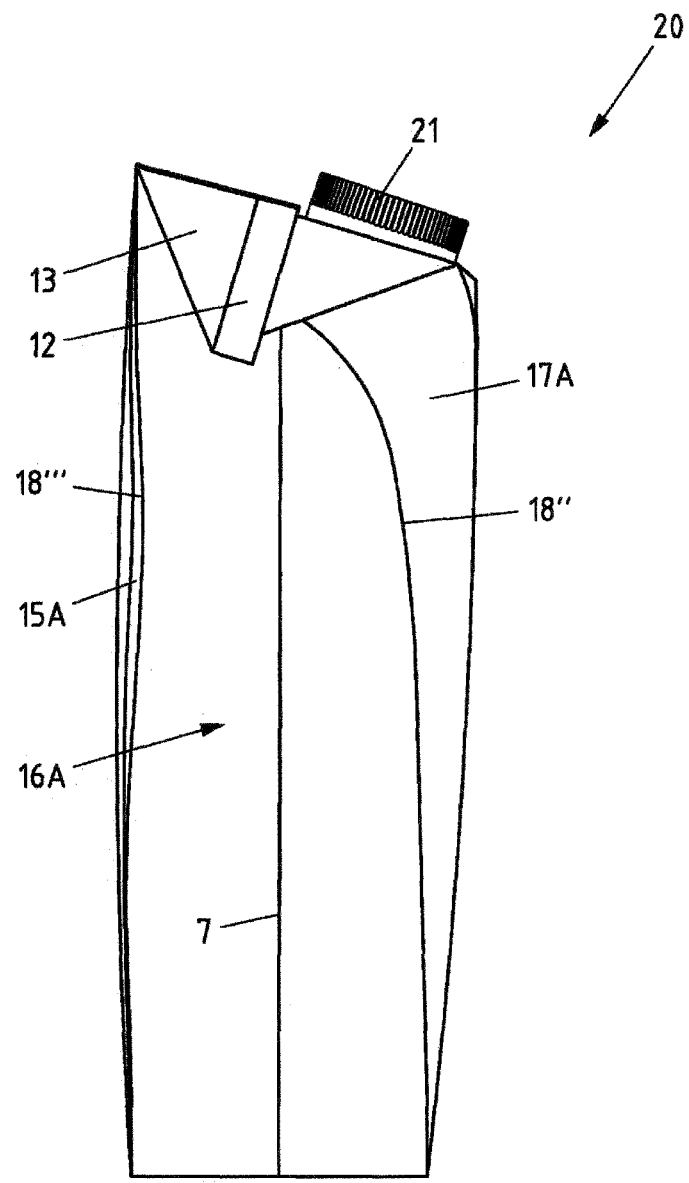
FIG. 4D: shows the package from FIG. 4A in a side view.

Finally, FIG. 4D shows the package 20 from FIG. 4A in a side view. The regions of the package 20 already described in connection with FIG. 1A to FIG. 4C are provided with corresponding reference numerals in FIG. 4D. The composition of the left side of the package 20 from the two first side surfaces 16A and a part of the first stress-relief surface 17A is particularly easily discernible in FIG. 4D. The (folded-back) secondary fold line 7 also runs through the first side surface 16A. The same applies to the opposite right side of the package 20 not shown in FIG. 4D, since the two sides are designed identically (mirror-symmetrically) to one another. In addition, it is clearly discernible in FIG. 4D that the package 20 in the upper region of its front side (right in FIG. 4D) is arched convexly outwards and in the upper region of its rear side (left in FIG. 4D) is arched concavely inwards.

LIST OF REFERENCE NUMERALS 1, 1': Flat-shaped composite material
2: Fold line 3, 3A, 3B: Sleeve surface
4: Sealing surface
5, 5', 5": Base surface
6, 6', 6": Gable surface
7: Secondary fold line
8: Triangular surface
9, 9': Package sleeve
10: Longitudinal seam
11: Package
12: Fin seam
13: Ear
14: Front surface
15A, 15B: First and second rear surface
16A, 16B: First and second side surface
17A, 17B: First and second stress-relief surface
18', 18", 18"': Sleeve fold line
19: Weakening zone
20: Package
21: Screw cap
$\alpha_B$: Base surface angle (of the fold lines in the base region)
$\alpha_{G1}$, $\alpha_{G2}$: Gable surface angle (of the fold lines in the gable region)
$\beta_1$, $\beta_2$: Inclination angle (with respect to the vertical $S_1$, $S_2$)
$\gamma$: Inclination angle (with respect to the horizontal W)
$d_{II}$, $d_{III}$: Distance (between third sleeve fold line 18"' and vertical S)
EA: Corner axis
E5: Corner point (of the base surface 5)
E6: Corner point (of the gable surface 6)
F: Main fibre direction
L: Longitudinal edge
S, S1, S2: Vertical
SB: Contact point (of the triangular surfaces 8 of the base surface 5)
SG: Contact point (of the triangular surfaces 8 of the gable surface 6)
V: Front edge (of the quadrangular gable surface 6")
W: Horizontal
I, II, III, IV: Sections (of the third sleeve fold line 18"')

The invention claimed is:

1. A flat-shaped composite material for manufacturing a package, comprising:
a polymer outer layer,
a polymer inner layer,
a fibrous support layer, which is arranged between the polymer outer layer and the polymer inner layer,
wherein the flat-shaped composite material has a plurality of fold lines, which are arranged and designed such that a closed package can be manufactured by folding the flat-shaped composite material along the fold lines and by connecting seam surfaces of the flat-shaped composite material,
a sleeve surface, wherein the sleeve surface comprises a front surface, a first side surface, a second side surface, a first rear surface and a second rear surface,
base surfaces, wherein the base surfaces comprise triangular base surfaces and quadrangular base surfaces, and gable surfaces, wherein the gable surfaces comprise triangular gable surfaces and quadrangular gable surfaces,
wherein the base surfaces and the gable surfaces are arranged on opposite sides of the sleeve surface,
wherein at least one quadrangular gable surface with two small gable surface angles, which are smaller than 90°, with two large gable surface angles, which are greater than 90°, and with an angle sum, which is greater than 360°, wherein at least one side of the quadrangular gable surface is curved outwards.

2. The flat-shaped composite material according to claim 1, wherein at least one of the quadrangular gable surfaces is approximately trapezoidal.

3. The flat-shaped composite material according to claim 1, wherein the quadrangular gable surface has a front edge which adjoins the front surface and which is curved.

4. The flat-shaped composite material according to claim 1, wherein two secondary fold lines, which run parallel to one another through the sleeve surface.

5. The flat-shaped composite material according to claim 1, wherein the sleeve surface has at least one stress-relief surface, which is arranged between the front surface and one of the two side surfaces.

6. The flat-shaped composite material according to claim 5, wherein at least one stress-relief surface adjoins a quadrangular base surface in the region of the base surfaces and adjoins a triangular gable surface in the region of the gable surfaces.

7. The flat-shaped composite material according to claim 5, wherein a first sleeve fold line, which is curved at least in sections, is provided between at least one stress-relief surface and the adjoining front surface.

8. The flat-shaped composite material according to claim 5, wherein a second sleeve fold line, which is curved at least in sections, is provided between at least one stress-relief surface and the adjoining side surface.

9. The flat-shaped composite material according to claim 1, wherein a third sleeve fold line, which is curved at least in sections, is provided between at least one side surface and the adjoining rear surface.

10. The flat-shaped composite material according to claim 9, wherein the third sleeve fold line has a plurality of sections, of which at least one section is curved and of which at least one section is straight.

11. The flat-shaped composite material according to claim 9, wherein the third sleeve fold line has a plurality of sections, of which the section of the adjoining the base surfaces and the section adjoining the gable surfaces are straight.

12. The flat-shaped composite material according to claim 9, wherein the third sleeve fold line has a plurality of sections, of which at least two sections have opposite curvature directions.

13. The flat-shaped composite material according to claim 1, wherein the fibrous support layer of the composite material has a main fibre direction, which runs approximately at right angles to a longitudinal edge of the composite material running from the base surfaces to the gable surfaces.

* * * * *